United States Patent [19]

Flexman, Jr. et al.

[11] Patent Number: 5,817,723

[45] Date of Patent: Oct. 6, 1998

[54] TOUGHENED THERMOPLASTIC POLYMER COMPOSITIONS

[75] Inventors: Edmund Arthur Flexman, Jr., Wilmington, Del.; Tatsuhiro Takahashi; Toshikazu Kobayashi, both of Yokohama, Japan

[73] Assignee: E. I. du Pont de Nemours and Company, Wilmington, Del.

[21] Appl. No.: 708,383

[22] Filed: Sep. 4, 1996

Related U.S. Application Data

[60] Provisional application No. 60/003,649 Sep. 7, 1995.

[51] Int. Cl.$^6$ .................................................. C08F 283/00
[52] U.S. Cl. ........................................ 525/480; 525/132
[58] Field of Search ..................................... 525/132, 480

[56] References Cited

U.S. PATENT DOCUMENTS

| | | | |
|---|---|---|---|
| 2,943,068 | 6/1960 | Freedman | 260/19 |
| 3,382,293 | 5/1968 | Price | 260/838 |
| 3,872,182 | 3/1975 | Sextro et al. | 260/830 |
| 3,903,197 | 9/1975 | Ishida et al. | 260/857 |
| 4,127,554 | 11/1978 | Soder | 260/37 |
| 4,167,500 | 9/1979 | Jazenski et al. | 260/29.3 |
| 4,582,869 | 4/1986 | Waggoner | 524/227 |
| 4,804,716 | 2/1989 | Flexman | 525/399 |
| 4,845,161 | 7/1989 | Richardson | 525/399 |
| 4,949,918 | 8/1990 | Akiyama et al. | 526/271 |
| 5,079,301 | 1/1992 | Machado et al. | 525/154 |
| 5,104,925 | 4/1992 | Honda et al. | 524/517 |
| 5,191,011 | 3/1993 | Tajima et al. | 524/512 |
| 5,200,460 | 4/1993 | Machado et al. | 524/494 |
| 5,210,137 | 5/1993 | Machado | 525/154 |
| 5,286,807 | 2/1994 | Flexman | 525/399 |
| 5,367,048 | 11/1994 | Shaw | 528/367 |

FOREIGN PATENT DOCUMENTS

| | | |
|---|---|---|
| A-014840 | 4/1961 | Japan . |
| A-096394 | 9/1972 | Japan . |
| 094449 | 7/1979 | Japan . |
| 05098039 | 10/1991 | Japan . |
| 05302014 | 4/1992 | Japan . |
| 06080858 | 9/1992 | Japan . |
| 7-11101 | 1/1995 | Japan . |
| 1033168 | 6/1966 | United Kingdom . |

OTHER PUBLICATIONS

Encyclopedia of Polymer Science and Engineering, vol. 8 (1987), pp. 279–284, John Wiley and Sons, N.Y.

*Primary Examiner*—Melvyn I. Marquis

[57] ABSTRACT

A toughened thermoplastic polymer composition comprising (a) 1–30 weight percent of a polar toughening agent compatibilized with a polyphenol, and (b) 70–99 weight percent of at least one thermoplastic polymer, the above state percentages being based on the total weight of components (a) and (b) only.

10 Claims, No Drawings

TOUGHENED THERMOPLASTIC POLYMER COMPOSITIONS

This application claims the benefit of U.S. Provisional Application No. 60/003,649 filed Sep. 7, 1995.

BACKGROUND OF THE INVENTION

This invention relates to thermoplastic compositions having improved toughness, including toughened polyoxymethylene (POM) compositions.

It is known that polyphenols are miscible in POM as well as in a great variety of other polymers due to their strong hydrogen bonding capability. POM is an excellent hydrogen bonding acceptor but has no donor capability, unlike nylons, and only a low level of polarity, unlike nylon and polyesters. Thus it has a limited range of "compatibility" with other polymers. The high level of crystallinity of POM also reduces its compatibility with other resins.

There are several toughness tests that measure different aspects of toughness. The notched Izod test measures resistance to crack propagation of an established crack. Tensile elongation and unnotched Izod measure resistance to crack initiation. All of these tests are performed in a way that cause breakage across the direction of flow so they tend to measure the type of toughness in the strongest direction. A molded object of commercial utility will have other dimensions and often tend to break in the weakest direction. A falling weight test such as the Gardner impact is useful for determining a measure of toughness which allows failure in the most brittle direction.

SUMMARY OF THE INVENTION

A toughened thermoplastic polymer composition comprising (a) 1–30 weight percent of a polar toughening agent compatibilized with a polyphenol, and (b) 70–99 weight percent of at least one thermoplastic polymer, the above state percentages being based on the total weight of components (a) and (b) only.

DETAILED DESCRIPTION OF THE INVENTION

This invention relates to thermoplastic polymer compositions that are characterized by improved toughness. The invention includes 70–99 weight percent of at least one thermoplastic polymer and 1–30 weight percent of a polar toughening agent compatibilized with a polyphenol. Preferred compositions include 90–99 weight percent of at least one thermoplastic polymer and 1–10 weight percent of a polar toughening agent compatibilized with a polyphenol.

As used herein, the term "thermoplastic polymer" includes all thermoplastically processable resins. Examples of suitable thermoplastic polymers include, but are not limited to thermoplastic polymers such as polyacetal, including polyoxymethylene, 6,6-polyamide, 6-polyamide, 4,6-polyamide, 12,12-polyamide, 6,12-polyamide, and polyamides containing aromatic monomers, polybutylene terephthalate, polyethylene terephthalate, polyethylene napthtalate, polybutylene napththalate, other aromatic polyesters, liquid crystal polymers, polycyclohexane dimethylol terephthalate, copolyeheresters, polyphenylene sulfide, polyacylics, polypropylene, polyethylene, polymethylpentene, polyetherimides, polycarbonate, polysulfone, polyethersulfone, polyphenylene oxide, polystyrene, styrene copolymers, mixtures and graft copolymers of styrene-based polymers and rubber, and glass reinforced or impact modified versions of such resins. Blends of these polymers such as polyphenylene oxide and polyamide blends, and polycarbonate and polybutylene terephthalate, are also suitable for use in this invention.

The term "polyoxymethylene" as used herein includes homopolymers of formaldehyde or of cyclic oligomers of formaldehyde, the terminal groups of which are end-capped by esterification or etherification, and copolymers of formaldehyde or of cyclic oligomers of formaldehyde with oxyalkylene groups with at least two adjacent carbon atoms in the main chain, the terminal groups of which copolymers can be hydroxyl terminated or may be end-capped by esterification or, etherification, and mixtures of homopolymer and copolymer.

More specifically, the polyoxymethylene polymer can be branched or linear and must have a number average molecular weight in the range of 10,000 to 100,000, preferably 25,000 to 90,000, more preferably 30,000 to 70,000, and most preferably 35,000 to 40,000. The molecular weight of the polyoxymethylene can be conveniently measured by gel permeation chromatography in m-cresol at 160° C. using a DuPont PSM bimodal column kit with nominal pore size of 60 and 1000Å. Although polyacetals having higher or lower molecular weight averages may be used, depending on the physical and processing properties desired, the polyacetal molecular weight averages mentioned above are preferred to provide optimum balance of good mixing of the various ingredients to be melt blended into the composition with the most desired combination of molding characteristics and physical properties in the molded articles made from such compositions.

As an alternative to characterizing the polyoxymethylene by its number average molecular weight, it may be characterized by its melt flow rate. Polyoxymethylenes which are suitable for use in the compositions of the present invention will have a melt flow rate (measured according to ASTM D-1238, Procedure A, Condition G with a 1.0 mm (0.0413, inch diameter orifice)) of 0.1–30 grams/10 minutes. Preferably, the melt flow rate of the polyoxymethylene used in the compositions of the present invention will be from 0.5–10 grams/10 minutes, most preferably about 5 grams/10 minutes for homopolymer and about 9 grams/10 minutes for copolymer.

As indicated above, the polyoxymethylene can be either a homopolymer, a copolymer or a mixture thereof. Copolymers can contain one or more comonomers generally used in preparing polyoxymethylene compositions. Comonomers more commonly used include alkylene oxides of 2–12 carbon atoms. If copolymer is selected, the quantity of comonomer will be not more than 20 weight percent, preferably not more than 15 weight percent, and most preferably about 2 weight percent. The most preferred comonomer is ethylene oxide, and preferred polyoxymethylene copolymers are dipolymers of formaldehyde and ethylene oxide where the quantity of ethylene oxide is about 2 weight percent.

The term "polar toughening agent" means a soft polymeric material with viscoelastic properties such that it is capable of absorbing energy and toughening the matrix within which it is dispersed. Examples include polyethylene glycol and other polyalkalyene glycols, a polar-olefin multipolymer, polymethyvinyl ether, polyepichlorohydrin, nitrile rubber, or an acrylic rubber.

The term "polar" means that the toughening agent contains groups capable of participating in hydrogen bonding, such as ether, carbonyl, ketone, ester, amide, halogen, nitrile, thioether, amine or sulfonyl.

The term "polyphenol" means a compound having more than one phenolic group on the molecule such as novolac resins, polyvinyl phenols, phenolated resins, a bisphenol or a biphenol.

The term "novolac resin" means a thermoplastic polymer of phenol and formaldehyde.

The term "compatible" means capable of being dispersed in a finely divided state such that physical properties of the blend are not reduced below an acceptable level of utility.

Examples of polar olefins include ethylene interpolymers, such as ethylene/butylacrylate/glycidolmethacrylate (EBAGMA), ethylene/butylacrylate/carbon monoxide (EBACO), and highly substituted ethylenelmethylacrylate (EMA, 45 wt%/55 wt %).

EXAMPLES

Unless noted otherwise, all blends were prepared in a 28 mm Werner & Pfleiderer co-rotating twin screw extruder. The screw design had two hard working segments generating high shear and a vacuum port was used. The barrel temperatures were screwed set at 190° C. The extrusion rate was about 25 pounds per hour and the screw r.p.m. was set at 200 for a POM of Mn 45,000 or lower molecular weight. For higher molecular weight POM (Mn 66,000), the r.p.m. was dropped to 150 and the rate was about 10 pounds per hour to avoid over heating.

Physical testing was done using ASTM D790 for flexural modulus, ASTM D638 strength and elongation, using jaw separation to establish elongation at 2 inches per minute, and ASTM D256 for Izod.

Unless otherwise noted, the novolac used was a thermoplastic phenol-formaldehyde resin with an Mn of about 1000, a Mw of about 1600, and a Tg of 81° C. All percents given are weight percents, unless otherwise indicated.

EXAMPLES 1–7

These examples are directed to toughening POM with a which is also miscible with polyphenol compatibilizer. The results demonstrated how the presence of novolac significantly increased the ability of PEG to toughen POM. This was unexpected because novolac is a very brittle solid due to its irregular structure and low molecular weight. For these examples the standard flex bar was cut in half and the near and far ends tested separately to determine if a difference existed in the Izod test. In this case, the far end was slightly tougher than the near end.

| Example no. | % POM | % PEG 200,000 | % NOVOLAC | F.M. Kpsi | % E | IZOD near/far end |
|---|---|---|---|---|---|---|
| 1 | 100 | 0 | 0 | 428 | 16 | 1.9/1.8 |
| 2 | 98 | 2 | 0 | 395 | 21 | 2.0/2.4 |
| 3 | 96 | 4 | 0 | 375 | 25 | 2.0/2.8 |
| 4 | 98 | 1.5 | 0.5 | 403 | 33 | 2.1/2.5 |
| 5 | 97 | 2 | 1 | 394 | 32 | 1.8/1.9 |
| 6 | 97 | 2.5 | 0.5 | 397 | 27 | 1.9/2.2 |
| 7 | 95 | 4 | 1 | 381 | 29 | 1.7/2.3 |

EXAMPLES 8–9

The effect of precompounding was examined in these examples. The novolac was first mixed with the PEG before the PEG came into contact with the POM. The PEG and novolac were blended at 150° C. in a small laboratory rotating truder manufactured by CSI model CS-194 Max Mixing Extruder.

These results showed that precompounding the components did not adversely affect the toughness of the POM and therefore is within the scope of this invention.

| Example no. | % POM | % 2:1 PEG 200,000/novolac | F.M. Kpsi | % E | IZOD |
|---|---|---|---|---|---|
| 8 | 100 | 0 | 414 | 19 | 1.6 |
| 9 | 97 | 3 | 382 | 41 | 1.7 |

EXAMPLES 10–21

The following blends were prepared as described above, and showed that the molecular weight of the PEG had little effect on the toughening of PEG/novolac. Controls from both series were included.

| Example no. | % POM | % PEG | PEG MW | % NOVOLAC | F.M. Kpsi | % E | IZOD near/far end |
|---|---|---|---|---|---|---|---|
| 10 | 100 | | | | 425 | 15 | 1.6 |
| 11 | 97 | 2 | PEG 3.4K | 1 | 372 | 36 | 1.7 |
| 12 | 97 | 2 | PEG 8K | 1 | 395 | 25 | 1.5 |
| 13 | 100 | 0 | | 0 | 428 | 16 | 1.9/1.8 |
| 14 | 97 | 2 | PEG 18.5K | 1 | 390 | 30 | 1.9/2.1 |
| 15 | 97 | 2 | PEG 100K | 1 | 389 | 32 | 2.0/2.5 |
| 16 | 97 | 2 | PEG 300K | 1 | 392 | 32 | 1.8/2.4 |
| 17 | 97 | 2 | PEG 400K | 1 | 400 | 30 | 1.9/2.4 |
| 18 | 97 | 2 | PEG 600K | 1 | 403 | 28 | 1.6/2.2 |
| 19 | 97 | 2 | PEG 900K | 1 | 403 | 30 | 1.8/1.8 |
| 20 | 97 | 2 | PEG 1000K | 1 | 402 | 27 | 1.7/2.1 |
| 21 | 97 | 2 | PEG 4000K | 1 | 403 | 26 | 1.8/1.9 |

EXAMPLES 22–30

The following examples demonstrated that a variety of polyphenols may be used and still achieve the desired results of this invention. A higher molecular weight POM, 65,000 Mn, was also used, and had an elongation significantly higher than the 45,000 Mw POM resin.

| Example no. | % POM | % PEG 200K | % | POLYPHENOL | F.M. Kpsi | % E | IZOD |
|---|---|---|---|---|---|---|---|
| 22 | 100 | | | | 398 | 31 | 2.5 |
| 23 | 98 | 2 | | | 374 | 27 | 2.7 |
| 24 | 97 | 2 | 1 | phenol-formaldehyde novolac | 374 | 30 | 2.9 |
| 25 | 97 | 2 | 1 | butyl phenol-formaldehyde novolac | 354 | 38 | 3.0 |
| 26 | 97 | 2 | 1 | octyl phenol-formaldehyde novolac | 362 | 36 | 3.0 |
| 27 | 97 | 2 | 1 | Nevilac 10 XL ("phenolated resin") | 344 | 33 | 2.8 |
| 28 | 97 | 2 | 1 | bisphenol A | 356 | 34 | 2.9 |
| 29 | 97 | 2 | 1 | 4,4'-biphenol | 346 | 33 | 2.9 |
| 30 | 97 | 2 | 1 | polyvinyl phenol | 369 | 35 | 3.1 |

EXAMPLES 31–34

The blends below were prepared using a POM with a lower molecular weight than the POM in the previous examples, and 200,000 molecular weight PEG with novolac. The Gardner Impact was done on ⅛" thick disks with an 8 pound weight having a ½" TUP. These results showed significant increases in and Gardner Impact using the blends of the invention.

| Example no. | % | POM MW | % PEG | % NOVO-LAC | F.M. Kpsi | % E | IZOD | GARDNER IMPACT inch-pounds |
|---|---|---|---|---|---|---|---|---|
| 31 | 100 | 29,000 | 0 | 0 | 451 | 7 | 1.1 | 28 |
| 32 | 97 | 29,000 | 2 | 1 | 424 | 18 | 1.4 | 73 |
| 33 | 100 | 35,000 | 0 | 0 | 442 | 11 | 1.4 | 41 |
| 34 | 97 | 35,000 | 2 | 1 | 410 | 20 | 1.3 | 99 |

EXAMPLES 35–39

A series of blends with different polar olefin terpolymers were prepared in the 28 mm twin screw extruder and injection molded in the 1.5 oz. machine using a 60° C. mold temperature. An amount of 10% rubber was used in Mn 45,000 POM.

The examples showed that the presence of the polyphenol improved the toughness in these polar ethylene terpolymers.

| Example no. | % POM | % | RUBBER | % NOV. | F.M. Kpsi | % E | IZOD |
|---|---|---|---|---|---|---|---|
| 35 | 90 | 10 | EBACO | 0 | 313 | 28 | 2.0 |
| 36 | 89 | 10 | EBACO | 1 | 295 | 42 | 2.7 |
| 37 | 90 | 10 | EBAGMA | 0 | 311 | 27 | 1.3 |
| 38 | 89 | 10 | EBAGMA | 1 | 314 | 40 | 2.1 |
| 39 | 89 | 11 | EBAGMA/5 % NOV | 0.5* | 308 | 44 | 1.7 |

*novolac precompounded into EBAGMA

EXAMPLES 40–41

Since PEG is a not uncommon component of a variety of potential additives, the following illustrates an additional utility for this invention, namely, that the PEG used in the inventive compositions may be present in the form of an additive in the POM composition. A PEG-silicone fluid with 58% silicone, a hydrophile/lipopile balance of 8.4, and a freezing point of 65° F. was used at the 2% level with 1% novolac from butyl phenol. The results versus control were:

| Example no. | % | % PEG-silicone | % Novolac | F.M. Kpsi | % E | IZOD |
|---|---|---|---|---|---|---|
| 40 | 100 | | | 425 | 15 | 1.6 |
| 41 | 97 | 2 | 1 | 400 | 34 | 1.2 |

It should be understood that the compositions of the present invention may include, in addition to the thermoplastic polymer and polar toughening agent compatibilized with a polyphenol, other ingredients, modifiers, and additives as are generally used in polyacetal molding resins, including co-stabilizers (such as those disclosed in U.S. Pat. Nos. 3,960,984; 4,098,843; and 4,766,168), anti-oxidants, pigments, colorants, UV stabilizers, toughening agents, nucleating agents, and fillers. It should also be understood that some pigments and colorants can, themselves, adversely affect the stability of polyacetal compositions.

The compositions of the present invention may be prepared by mixing the polymer stabilizer, which has a number average particle size of less than 10 microns and which is non-meltable, or may be made non-meltable during processing, with the polymer at a temperature above the melting point of the polymer using any intensive mixing device conventionally used in preparing thermoplastic compositions, such as rubber mills, internal mixers such as "Banbury" and "Brabender" mixers, single or multiblade internal mixers with a cavity heated externally or by friction, "Ko-kneaders," multibarrel mixers such as "Farrel Continuous Mixers," injection molding machines, and extruders, both single screw and twin screw, both co-rotating and counter rotating, both intermeshing and non-intermeshing. These devices may be used alone or in combination with static mixers, mixing torpedoes and/or various devices to increase internal pressure and/or the intensity of mixing, such as valves, gate or screws designed for this purpose. Extruders are preferred. Of course, such mixing should be conducted at a temperature below which significant degradation of the polyacetal will occur. The polymer stabilizer in the composition after melt processing will have a number average particle size less than 10 microns.

Shaped articles may be made from the compositions of the present invention using any of several common methods, including compression molding, injection molding, extrusion molding, blow molding, rotational molding, melt spinning, and thermoforming. Injection molding is preferred. Examples of shaped articles include sheet, profiles, rod stock, film, filaments, fibers, strapping, tape tubing, and pipe. Such shaped articles can be posttreated by orientation, stretching, coating, annealing, painting, laminating, and plating. Such shaped articles and scrap therefrom can be ground and remolded.

Processing conditions used in the preparation of the compositions of the present invention and shaped articles made therefrom include melt temperatures of about 170° C.–260° C., preferably 185° C.–240° C., most preferably 200° C.–230° C. When injection molding the compositions of the present invention, the mold temperature will generally be 10° C.–120° C., preferably 10° C.–100° C., and most preferably about 50° C.–90° C.

We claim:

1. A toughened thermoplastic polymer composition comprising
   (a) 1–30 weight percent of a polar toughening agent compatibilized with a polyphenol, and
   (b) 70–99 weight percent of at least one thermoplastic polymer comprising polyoxymethylene,
   the above state percentages being based on the total weight of components (a) and (b) only, with the proviso that said polyphenol is miscible with said polyoxymethylene.

2. The composition of claim 1, comprising
   (a) 1–10 weight percent of a polar toughening agent compatibilized with a polyphenol, and
   (b) 90–99 weight percent of at least one thermoplastic polymer,
   the above state percentages being based on the total weight of components (a) and (b) only.

3. The composition of claim 1,
   wherein the ratio of polar toughening agent to polyphenol is from 1:1 to 10:1.

4. The composition of claim 1,
   wherein the ratio of polar toughening agent to polyphenol is from 1:1 to 2:1.

5. The composition of claim 1,
   wherein the polar toughening agent is polyethylene glycol, a polar olefin, polymethyvinylether, polyepichlorohydrin or an acrylic.

6. The composition of claim 1, wherein the polyphenol is a novolac resin, a polyvinyl phenol, or a phenolated resin.

7. The composition of claim 1, additionally comprising the thermoplastic polymer selected from the group consisting of polyaetal, 6,6-polyamide, 6-polyamide, 4,6- polyamide, 12,12-polyamide, 6,12-polyamide, a polyamide containing aromatic monomers, polybutylene terephthalate, polyethylene terephthalate, polyethylene napththalate, polybutylene napththalate, an aromatic polyester, liquid crystal polymer, polycyclohexane dimethylol terephthalate, copolyetherester, polyphenylene sulfide, polyacrylic, polypropylene, polyethylene, polymethylpentene, a polyetherimide, polycarbonate, polysulfone, polyethersulfone, polyphenylene oxide, polystyrene, styrene copolymer, mixtures and graft copolymers of styrene and rubber, and blends thereof.

8. The composition of claim 7, wherein the polyoxymethylene is a homopolymer of formaldehyde or of cyclic oligomers of formaldehyde.

9. The composition of claim 7, wherein the polyoxymethylene is a copolymer of formaldehyde or an oligomer of formaldehyde with oxyalkylene groups with at least two adjacent carbon atoms in the main chain.

10. A molded article made from the polymer composition of any of claims 1 to 9.

* * * * *